United States Patent [19]

Mercer et al.

[11] Patent Number: 4,926,375
[45] Date of Patent: May 15, 1990

[54] MULTIPLE NODES BROADCAST COMMUNICATION METHOD WITH RECEIVER IDENTIFICATION BY BIT POSITION IN TRANSFERRED MASSAGE

[75] Inventors: Ferrell L. Mercer; Earl J. Whitaker; Christopher P. Cuthbert, all of Charlottesville, Va.

[73] Assignee: GE Fanuc Automation North America, Inc., Charlottesville, Va.

[21] Appl. No.: 46,992

[22] Filed: May 5, 1987

[51] Int. Cl.$^5$ .............. G06F 13/14; G06F 15/56; H04Q 1/00; H04J 3/02

[52] U.S. Cl. .............................. 364/900; 364/940; 364/940.1; 364/927.92; 364/927.93; 364/939; 364/939.2; 364/940.61; 364/940.64; 364/940.81; 370/94.1; 370/85.6; 370/85.12

[58] Field of Search ... 364/200 MS File, 900 MS File, 364/142, 200, 900; 370/88, 94

[56] References Cited

U.S. PATENT DOCUMENTS

| | | | |
|---|---|---|---|
| 4,672,607 | 6/1987 | Nakayashiki et al. | 370/88 |
| 4,680,753 | 7/1987 | Fulton et al. | 370/89 |
| 4,725,834 | 2/1988 | Chang et al. | 340/825.5 |
| 4,773,067 | 9/1988 | Duxbury et al. | 364/200 |
| 4,779,092 | 10/1988 | Takao | 340/825.51 |
| 4,818,984 | 4/1989 | Chang et al. | 370/94 |

Primary Examiner—Archie E. Williams, Jr.
Assistant Examiner—Emily Y. Chan
Attorney, Agent, or Firm—Ormand R. Austin

[57] ABSTRACT

A data sharing mechanism employs a broadcast bus communication system to physically interconnect various control and monitoring nodes that cooperate in controlling a physical process. Shared, or global, variables are exchanged between connected nodes via a global data service provider and protocol. The protocol allows global variables to be addressed by symbolic names with multiple namespaces for the names. Additionally, the protocol allows data to be formatted with special identifiers such that once a variable name has been located in a message from a specified source, and other messages from that source with the same identifier are received, they will have the named variables in the same relative locations. The receiver can therefore directly index to the named variable when the source and identifier are known.

1 Claim, 7 Drawing Sheets

MULTIPLE NODES BROADCAST COMMUNICATION METHOD WITH RECEIVER IDENTIFICATION BY BIT POSITION IN TRANSFERRED MASSAGE

The present invention relates to a data communication system and, more particularly, to a method and apparatus for sharing of control and status information among a number of loosely coupled control and monitoring nodes of a distributed control system.

BACKGROUND OF THE INVENTION

In various systems employed within the manufacturing, chemical processing and power generation industries and in other applications, equipment is coupled together by a communication network to form a distributed control system. Such communication allows for (1) transfer of data and (2) control of connected equipment. The network employs a broadcast bus to physically interconnect control and monitoring nodes associated with a physical process. A node, as used herein, refers to any device connected to the communication network for either supplying data (a Source) or receiving data (a Sink). A node may act as both source and sink. For example, one node may be a controller such as, for example, a General Electric Company Programmable Controller (PC) distributed under the brand 'Series Six', which PC may provide commands to operate equipment (source) and receive data (sink) indicative of the status of the equipment.

The communication network for factory control may include an overall broadband Local Area Network (LAN) supporting a number of smaller networks or "subnets". FIG. 1 illustrates an exemplary system in which a subnet carrier band LAN interconnects several devices forming a workcell. In such systems, it is important that each node be independent and perform its assigned task regardless of the other nodes. The communication network provides a data transfer function allowing each node to receive or generate data of interest. In some networks, data was sent to each node on the network, in sequence, with a separate message to each. In other words, sinks must "poll" sources; i.e., the sink node sends, in turn to all source nodes, a request message, receiving the data in separate response messages from each. More efficient networks use a broadcast technique in which each node sends all data onto the communication bus and all other nodes receive the data. The receiving nodes then evaluate and retain only data of interest to each.

A disadvantage of the above described broadcast technique is that each node must read each message on the network or subnet to identify data of interest to it. Since some data may be transmitted at high repetition rates and be part of a large group of data, time required for each node to identify and process selected data may affect system performance.

Another disadvantage is that, when nodes are added or deleted, existing nodes need to be changed to extend their knowledge of the system to these new nodes.

SUMMARY OF THE INVENTION

It is an object of the present invention to provide a communication system which overcomes the above mentioned disadvantage of prior data transfer techniques.

It is another object of the invention to provide a data sharing mechanism which allows a receiving node to identify and retain data of interest in an efficient manner.

It is a still further object to provide a data sharing mechanism which is easily implemented at user nodes.

It is yet another object to provide a data sharing mechanism which permits each node's application to be changed independently of other nodes.

The above and other objects, features and advantages are attained in a communication network (hereinafter "Subnet") in which a global data service provider is associated with each node on the Subnet. The service provider allows source and sink nodes to share data by having the current state of the data copied on a periodic basis from a source node to one or more sink nodes. A node becomes a source by directing the associated service provider to transfer data from it to one or more sink nodes. The source node specifies: the direction of transfer (i.e., output), the data priority, whether or not the data is "global" (i.e., intended for all or a group of nodes) and a group address, a variable name for the data (for example, "TEMP"), the update rate for sourcing the named data and a local reference for where to get the data to be output. Thereafter, the provider formats a message for transfer onto the communication network. The formatted message block includes the priority, the destination or group address, the source address, an indicator of message type, a format key, the number of variables in the message and the list of variables, each accompanied by its name, type, length and value. At each other service provider coupled to the network, the formatted message is detected and its group address read. If the provider is among the addressed group, the message is searched for a variable of interest to the provider. The node associated with the provider will have previously identified variables of interest via an appropriate global input request, so that the provider has in memory a variable name for which to search. Similar to a source, a node becomes a sink by directing the associated service provider to receive global data. The sink specifies the direction of transfer (i.e., input), the group address, the name of the variable, the local reference where the global data is to be stored, a local reference where status is to be repeated, and a "timeout" value. When a variable of interest is found, the provider stores the source address, format key and a corresponding offset from the message start to the location in the message of the data of interest. Thereafter, whenever a message is received for that destination address, the provider checks the source address and format key and if they match those of a previously received message, the provider uses the stored offset value to index directly to the data of interest. In this manner, high data sampling rates may be sustained on the network.

The actual data source node need not be known to the sink or receiving node since the data is located by reference to a symbolic variable name. This allows a node's application to be changed without affecting any other node. In addition, the location of data within each node is immaterial and may be changed without affecting other nodes.

This allows "backup" or redundant sources for critical variables, whereby, if a primary source fails and no longer sends the variable, its backup will recognize this fact and begin sourcing that variable. Other sinks, after initially "timing out" will discover the presence again of the named variable and again begin receiving it.

In an exemplary embodiment, the service provider comprises a command processor coupled via a data link to an application device (node) such as a PC. The command processor receives and processes commands from the node to transmit or receive data (variables). A variable state table is associated with the processor for storing variables and for keeping track of whether variables of interest have been found. Data transfer means is coupled to the node for coordinating the actual data transfer between a communication bus and the node. This control is effected by a bus access controller and a data buffer. The bus access controller responds to either a send or receive means, each coupled to the data transfer means, for moving data between the bus and node. A timer initiated by the command processor provides timing signals to the various functions for controlling data flow.

BRIEF DESCRIPTION OF THE DRAWING

For a better understanding of the present invention, reference may be had to the following detailed description taken in conjunction with the accompanying drawing in which.

DETAILED DESCRIPTION

Figure 1:
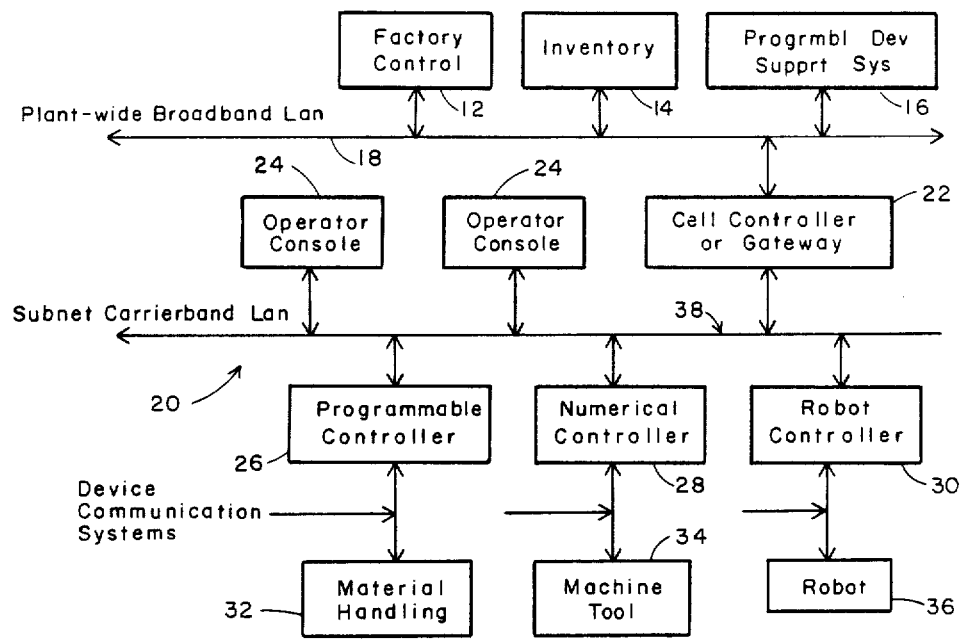
FIG. 1 is an illustration of a factory communication systems hierarchy.

FIG. 1 illustrates one form of factory communication systems hierarchy. In this system, high level control functions and resources, such as, for example, an overall factory control 12, an inventory monitor 14 and a programmable device support system 16, are coupled together by means of a plant wide communication system using a broadband local area network (LAN) 18. The LAN 18 also couples multiple work cells, one of which is indicated generally at 20, to the higher level control and reporting functions through a gateway 22. At each cell 20 there may be a large number of other control or operator stations 24 accessing a cell communication network or subnet carrierband LAN 38 (hereinafter "Subnet"). Coupled to the Subnet are various controllers, such as, for example, a programmable controller 26, a numerical control 28 and a robot control 30, each directing an associated hardware function such as material handling 32, machine tool 34 and robot 36. The present invention provides LAN communication capability among and between controllers 26, 28 and 30 and other factory automation devices residing on a single subnet LAN segment 38. For purposes of illustration, the invention will be described in an embodiment particularly adapted for use in a General Electric Company Series Six programmable logic controller (PC) although it will be apparent that other types of controllers can interface with or be substituted for such a PC on the Subnet LAN.

Communication on the Subnet may employ various other types of communication standards such as General Motors Corp. Manufacturing Automation Protocol (MAP). MAP allows each of the nodes (controllers 26, 28 and 30 and consoles 24) to access the Subnet LAN for either receiving or sending data using a protocol distinct from global data. For purposes of description, a node may be a source (sending or providing data) or a sink (receiving data) or both at the same or different times.

This invention relates to a data sharing protocol which allows sharing of selected data among nodes on the subnet in realtime. In particular, there is disclosed a global data transfer allowing producers and consumers of named data to share the state of this data by having the current state of the data copied on a periodic basis from the producer to the consumer(s) of the data. No application interaction is required other than an initial indication of which data are to be output and/or input at each node.

Figure 2:
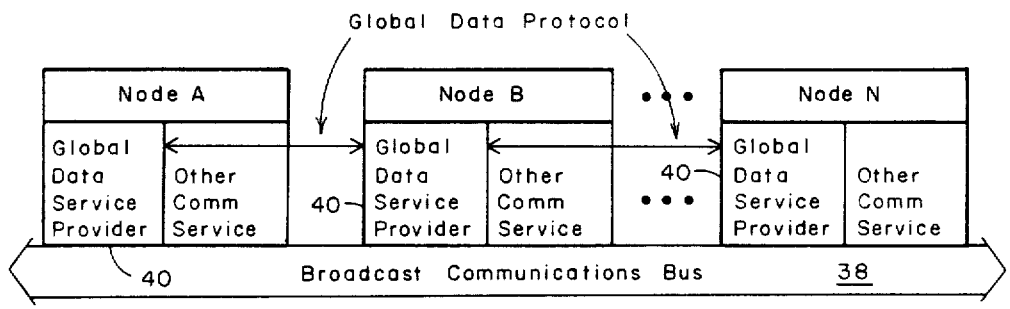
FIG. 2 is a functional block diagram of a communication sub-network in one form of the present invention.

FIG. 2 illustrates functionally a group of nodes each coupled to the subnet LAN 38 by an associated global data service provider 40. The providers 40 are hardware interfaces (microcomputers, timers, data buffers and bus controllers) providing data transfer between the LAN 38 and the nodes. The providers 40 operate in accordance with stored programs to organize, identify, encode and format messages for transmission on the LAN and to search and extract desired data from messages received. Since the following description is given in terms applicable to a Series Six PC, the providers 40 may be sometimes referred to as a Series Six Subnet card or merely Subnet card.

In the hierarchy of factory communication systems, the Subnet serves as a stand alone network or subsidiary to a plant-wide network as shown in FIG. 1. It is used to coordinate a related group of device controllers. The plant-wide communication system lies above this "subnetwork" layer and the dedicated controller to device communication systems lie below this layer. The application needs that the Subnet communication system must fulfill are summarized as follows:

DISTRIBUTED CONTROL NEEDS

Exchange sampled data with peers
Exchange unique data with peers
"Peers" includes loosely coupled operator consoles that provide:
  Real time graphics display of process
  Rapid change of displays (pictures)
  Any console may show any display
Autonomy from supervisory computer and plant-wide communication system
Simple to maintain/change

PLANT SUPERVISION NEEDS

Standard access to all vendors' programmable control devices from supervisory computers
Centralized application program storage
Process monitoring
Coordination of processes.

The communication needs of distributed control are more demanding than those of the supervisory computer(s), perhaps 100 to 1000 times more demanding in terms of response time and throughput. Consequently, the appropriate communication system is one that:

(1) efficiently handles the distributed control needs, yet (2) provides access to attached programmable devices from supervisory computers(s) using the MAP connection-oriented protocols.

To serve the needs identified above, Subnet provides two kinds of communication services:

(1) Global Data Services
(2) Connection-Oriented Services, e.g., MAP

Primarily, global data services address the distributed control needs, and connection-oriented services address the supervisory computer needs. Global data services provide flexible symbolic references to variables produced by any controller and shared with other controllers and/or operator consoles.

Connection-oriented services in one form of the present invention are MAP services. Both global data and connection-oriented services are provided by all Subnet LAN Interface Units (LIU's). Reference will be made throughout this description to a number of hardware and software interface units and drivers such as, for example, LIU, PC driver, LLC (Logical Link Control). "LIU" refers to the illustrated system of FIG. 2, including the invention as well as other unrelated functions, "PC driver" is equivalent to the "Application Data Transfer" shown in 40 of FIG. 3. "LLC" is equivalent to the "Bus Access Controller" shown in 40 of FIG. 3. The operation of such elements is described in order to provide an understanding of their interface and utility with the present invention.

The distinguishing characteristics of Subnet's communication services, are:

Most process control data is sampled rather than unique.

Broadcast can efficiently transfer data from a source to multiple destinations at frequent intervals.

Destination station(s) need not be known to the source.

Process can be made very reliable due to the independence of stations.

Station failure is quickly and easily detected.

Redundant or backup stations are transparent to other stations.

Therefore, Subnet global data services use the broadcast technique. Global data services are appropriate for transmission of sampled data.

Transmission of unique data requires the use of some other communication service.

Connected service is appropriate for transferring large files (e.g., program download), for reaching MAP stations on other network segments, or whenever full MAP services are required.

For a General Electric Company Series Six Programmable Logic Controller (PC), all locally initiated serial communication requests are issued using a Serial Communication Request (SCReq) instruction. SCReq's are used to issue service requests for global I/O, datagrams, or MAP services. SCReq provides a pointer to a service request block in a register table, whose first register contains a COMMAND parameter. The COMMAND parameter distinguishes the type of service requested. Until the LIU confirms each (SCReq), no other (SCReq) will be accepted.

Remote responses or remotely initiated transactions result in local data transfer without action by the local PC application program. The Series Six PC is representative of the class of controllers involved. Other devices interface similarly Subnet communication services may illustratively use

| SERVICE | TOPOLOGY | LIU ACTION | XFR CHARACTERISTICS |
|---|---|---|---|
| GLBL OUT | ONE TO MANY | ONE RQST/PERIODIC SND | SEND B'CAST |
| GLBL IN | MANY TO ONE | ONE RQST/PERIODIC RVC | RECEIVE B'CAST |
| CONNECTED | ONE TO ONE | 1ST RQST/MAKE CONN+ONE XFR EACH FINAL RQST/ONE XFR+BRK CONN 1ST RQST CAN ALSO BE FINAL | AUTO FLOW CONTROL, RETRANS AS RQD |

In dealing with data in distributed control systems, two kinds of data need to be distinguished: Sampled Data—Data which tracks the current value of a variable (e.g., temperature, position, number of parts) over a continuous range of values. Sampling rate is sufficient that loss or duplication of a single sample can occur without consequence.

Unique Data—Data for which loss or duplication changes the intended meaning and, therefore, cannot be tolerated. For example, an indication that "associated counter value wrapped around"; or a command to "move robot arm 5 inches to the right". If this information were lost or duplicated, the frame sequence of which this frame is part, would have erroneous results. Often, matters of safety or great expense are at risk. Broadcast is the preferred technique for transferring sampled data because:

lower layer services provided as shown in Table 1. However, this invention is not limited or restricted to these particular underlying services. For example, lower layer services could be provided by Ethernet TM or other well known services.

TABLE 1

| LAYER | GLOBAL SERVICES | CONNECTION-ORIENTED SERVICES |
|---|---|---|
| APPLICATION | SUBNET | CASE/MMFS |
| SESSION | NULL | ISO |
| TRANSPORT | NULL | ISO |
| NETWORK | NULL | ISO CLNS |
| LLC | 802.2 TYPE 1 | 802.2 TYPE 1 |
| MAC | 802.4 | 802.4 |
| PHYSICAL | 802.4 5 MBPS CARRIERBAND OR 10 MBPS BROADBAND | |
| MEDIUM | 802.4 5 MBPS CARRIERBAND OR | |

TABLE 1-continued

| LAYER | GLOBAL SERVICES | CONNECTION-ORIENTED SERVICES |
|---|---|---|
| | | 10 MBPS BROADBAND |

A Subnet global database consists of each station broadcasting the global data that it generates. Group addressing is used. Variables are known to those stations in the group according to symbolic names. The system detects failed stations and readily accommodates changes in the global database. Table 2 depicts a Subnet global database.

TABLE 2

| SOURCE STATION | VARIABLES BROADCAST TO ALL STATIONS SHARING SAME GROUP ADDRESS | | |
|---|---|---|---|
| Station 1 | RED | MASON | |
| Station 2 | GREEN | WHITE | PAINTER |
| . | | | |
| . | | | |
| Station n | PURPLE | GOLD | MECHANIC ROSEBUD |

Variables transferred in a global database are either of two types: bit strings or octet strings of an indicated length.

The atomic unit of transfer in a global database is the variable: i.e., whatever amount of data comprise that variable, they are collectively treated as an entity and are transferred only as an atomic whole; only complete singular samples (e.g., from the same PC scan) are input or output. (Separate variables, even from the same controller, are not atomic.) Data samples will be delivered to the destination application in the same sequence they were sent by the source application. Conditions will occur where a sample of data will be lost. Loss of a sample will occur if:

(1 the frame containing the sample is subject to a common error (the entire frame is discarded), or
(2 if a subsequent sample is received at the destination LIU before the destination application accepts the prior sample (the prior sample may be discarded), or
(3) if a subsequent sample is sent from the source application before the MAC token has allowed the source LIU to transmit the prior sample (the prior sample may be discarded).

Duplication of samples will not occur.

The PC application program will typically issue one or two Global Output Requests upon initialization that will satisfy all control needs. Additional Global Output Requests might be issued, during operation, in response to application-level requests for various display information from remotely connected operator consoles.

The Global Output Request conveys needed information to the local LIU which then commences periodic transfer of information from the local PC to remote PC's (or other devices) attached via the Subnet The PC application program:
(1) using (MOVE BLOCK) instructions, preloads a number of consecutive registers to produce a Global Output Request Block.
(2) then, if the LIU is not busy, issues a (SCReq) which contains a pointer to the Global Output Request Block,
(3) then, waits for an indication of either (SCReq) complete without error or (SCReq) complete with error.
(4) At this point, the registers used for the Global Output Request Block may be reused for any other purpose, or another (SCReq) may be issued.

A Global Request block takes the following form:

TABLE 3

| COMMAND | | |
|---|---|---|
| GROUP ADDRESS | | |
| SCHEDULE | | |
| PRIORITY | | |
| NUMBER OF VARIABLES | | (i) |
| NAME/C1 | /C2 | Output Variable 1 |
| /C3 | /C4 | |
| /C5 | /C6 | |
| /C7 | /CN | |
| TYPE | | |
| LENGTH | | |
| LOCATION | | |
| NAME/C1 | /C2 | Output Variable 2 |
| /C3 | /C4 | |
| /C5 | /C6 | |
| /C7 | /CN | |
| TYPE | | |
| LENGTH | | |
| LOCATION | | |
| NAME/C1 | /C2 | Output Variable i |
| /C3 | /C4 | |
| /C5 | /C6 | |
| /C7 | /CN | |
| TYPE | | |
| LENGTH | | |
| LOCATION | | |

In the preferred embodiment, the following definitions apply to the parameters indicated in the request block: COMMAND specifies to the LIU what kind of Serial Communication Request (SQREQ) is to be performed. There are two global output COMMAND values:

(1) Start Global Output
(2) Stop Global Output

Start Global Output starts the periodic output of specified variables to a global database. Start Global Output overrides any prior global output request which specified the same GROUP ADDRESS.

Stop Global Output deactivates the previously specified global output request which has the same GROUP ADDRESS.

GROUP ADDRESS specifies the group address to which the specified global output data will be broadcast or to which the request applies.

SCHEDULE specifies the periodic interval at which data transfer will be scheduled to output. Output from the PC will always occur coincident with the end of the scan in which it was scheduled. Values are:

(1) Every controller Scan and
(2) from 0.01 to 60 seconds, in increments of 0.01 seconds.

At each schedule interval, the LIU does two things:
(1) immediately restarts the elapsed time clock for the specified period, and
(2) at the end of the current scan, reads the global output variables from the PC and queues the LLC/MAC to send the next time the token arrives.

PRIORITY assigns the relative priority of the message across the network. For example, in the exemplary embodiment there are two priority values:

(1) Control and
(2) Display.

Should LAN bandwidth or resources in the local or a remote LIU become constricted, Control level priority messages take precedence.

NUMBER OF VARIABLES indicates to the LIU the length of the Global Output Request Block. Values are 1 to 256, i.e., the maximum number of registers that may be output by an active Global Output Request is 256.

NAME assigns a global reference of up to N characters in length to the internal register identified by LOCATION. C1 to CN indicate the character positions within the name, with C1 being first. All character values are significant. The name of each variable must be unique across the specified GROUP ADDRESS.

TYPE indicates the format of the data which comprise the variable, e.g., a string of octets.

LENGTH indicates how many consecutive registers, beginning at LOCATION, comprise the variable. Each variable, of the LENGTH specified, is preserved as an atomic whole; only complete samples (e.g., from the same PC scan) are transferred.

LOCATION is a pointer to the (first) internal register containing the variable. The same internal register may be output under more than one variable name.

A PC application program will typically issue a single Global Input Request upon initialization. The Global Input Request conveys required information to the local LIU which then commences periodic input of information to the local PC from remote PC's (or other controllers) connected via the Subnet LAN.

The PC application program:
(1) using (MOVE BLOCK) instructions, preloads a number of consecutive registers to produce a Global Input Request Block,
(2) then, when the LIU is not busy, issue a (SCReq) which contains a pointer to the Global Input Request Block,
(3) then waits for an indication of either complete without error or complete with error.
(4) At this point, the registers used for the Global Input Request Block may be reused for any other purpose, or another (SCReq) may be issued.

A Global Input Request block has the following format:

TABLE 4

| COMMAND | | |
|---|---|---|
| GROUP ADDRESS | | |
| STATUS TABLE | | |
| NUMBER OF VARIABLES | | (i) |
| NAME/C1 | /C2 | Input Variable 1 |
| /C3 | /C4 | |
| /C5 | /C6 | |
| /C7 | /CN | |
| TYPE | | |
| LENGTH | | |
| LOCATION | | |
| TIMEOUT | | |
| NAME/C1 | /C2 | Input Variable 2 |
| /C3 | /C4 | |
| /C5 | /C6 | |
| /C7 | /CN | |
| NAME/C1 | /C2 | Input Variable i |
| /C3 | /C4 | |
| /C5 | /C6 | |
| /C7 | /CN | |
| TYPE | | |
| LENGTH | | |
| LOCATION | | |

TABLE 4-continued

TIMEOUT

In the preferred embodiment, the parameters in the Input Request block are defined as follows:

COMMAND specifies to the LIU what kind of Serial Communication Request (SQREQ) is to be performed. There are two global input COMMAND values:
Start Global Input
Stop Global Input Start Global Input initiates the periodic input of specified variables from a global database. Start Global input overrides any prior global input request which specified the same GROUP ADDRESS.

Stop Global Input deactivates the global input request which has the same GROUP ADDRESS.

GROUP ADDRESS specifies the group address from which the specified global input data will be received or to which the request applies.

STATUS TABLE identifies the internal register(s) where status bits, corresponding to the specified variables, are to be stored. There are two status bits per variable, so that faults can be quickly detected and isolated. Either bit TRUE indicates a fault; the corresponding input variable is invalid. Both bits FALSE indicates the variable was received and transferred successfully.

Ln=Length or type mismatch; the local and remote (source) stations have specified a different type or length for the variable.

Tn=Timeout; the timeout value lapsed without receiving data. Until the first sample of data is input, Tn is TRUE to indicate that the internal register(s) contain invalid data.

Where n is a sequentially assigned variable number.

The STATUS TABLE is arranged according to the of the variables in the Global Input Request block.

| STATUS TABLE | T8 L8 T7 L7 T6 L6 T5 L5 T4 L4 T3 L3 T2 L2 T1 L1 |
|---|---|
| | T9 L9 |
| | etc. |

So long as the Global Input Request is active, the Status bits in the STATUS TABLE are updated by the LIU whenever any status changes; therefore, fault indications clear automatically as soon as the fault is cleared.

NUMBER OF VARIABLES indicates to the LIU the length of the Global Input Request Block.

NAME identifies a global variable to be input. The GROUP ADDRESS will be searched for NAME and the corresponding value will be input as often as received (subject to the limitation that the most recently received value of a variable will be input at the end of any PC scan). C1 to C8 indicate the character positions within the name, with C1 being first. All character values are significant. The name of each variable must be unique across the specified GROUP ADDRESS.

TYPE indicates the format of the data which comprise the variable, e.g., a string of octets.

LENGTH indicates how many consecutive registers, beginning at LOCATION, are allocated to receive the variable. Each variable, of the LENGTH specified, is preserved as a atomic whole; only complete samples (e.g., from the same PC scan) are transferred. If the LENGTH specified is different than that specified by the sender of the variable, the corresponding Ln status bit is set TRUE.

To illustrate the application of the above guidelines, Table 5 shows how a distributed system might allocate different group addresses to different set of data.

TABLE 5

| GROUP ADDRESS | PRIORITY | SCHEDULE | DISPLAY DATA SUBDIVISION | FURTHER ON/OFF CONTROL |
|---|---|---|---|---|
| 1 | CONTROL | 0.1 SEC. | | — |
| 2 | CONTROL | 1.0 SEC. | | |
| 3 | DISPLAY | 0.5 SEC. | DATA A | SOURCE STA X SOURCE STA Y SOURCE STA Z |
| 1 | DISPLAY | 0.5 SEC. | DATA B | SOURCE STA X SOURCE STA Y SOURCE STA Z |
| — | — | — | — | — |
| — | — | — | — | — |
| — | — | — | — | — |
| 8 | DISPLAY | 0.5 SEC. | DATA F | SOURCE STA X SOURCE STA Y SOURCE STA Z |

LOCATION is a pointer to the (first) PC register to receive the global variable. No PC register may receive more than one global input variable. This restriction applies across all GROUP ADDRESSes.

TIMEOUT specifies the maximum time to be allowed between receiving successive values of the specified variable. If the TIMEOUT period lapses without receiving the variable, the corresponding Tn status bit is set TRUE. Values for TIMEOUT are from 0.01 to 300 seconds, in increments of ) 0.01 seconds. However, the number of unique values of TIMEOUT may be restricted on some LIU's.

In applying global I/O service, the user must allocate group addresses, schedules, and priorities according to his distributed control needs. General requirements in the preferred embodiments are as follows:

(1) Each distributed system of controllers and operator consoles that are to share global data must be physically interconnected on the same Subnet LAN segment. (A segment is a section of LAN on which nodes can directly hear and communicate to all other nodes on the same segment without the aid of any interconnecting devices).

(2) If multiple systems (as in 1 above) share the same Subnet LAN segment, unique group addresses must be assigned to each separate distributed system.

(3) If, within a system, different sets of data are to be assigned different priorities, each set must be assigned a different group address.

(4) If, within the same system and priority, different sets of data are to be output according to different schedules, each set must be assigned a different group address.

(5) Some variables are only sensed intermittently, such as those associated with particular operator displays. Better network performance can be achieved if output of these variables is turned on and off as needed. Therefore, these variables might be logically grouped and assigned separate group addresses. (Datagram services or global data services can be used to communicate such requests (e.g., using a register variable defined at the application level) from an operator console to a specific controller or controllers.)

(6) The maximum number of group addresses available on any Subnet LAN segment is 48.

Only one transaction may be processed by the PC application at a time. Once processing of a transaction has commenced, any attempt to initiate another transaction on the part of the local application or on the part of a remote peer receives an error response from the LIU software. Once any required response to a transaction has been received or generated by the PC application, the local or remote application is free to initiate the next transaction.

The (SCReq) status register "busy" indication applies only to the interface between the application and the local LIU. Busy is true only while the local LIU accepts or rejects each command. It is entirely possible to be waiting for a transaction to complete while having the (SCReq) status show not busy. This allows datagram or global data traffic to be sent to the LIU software while waiting for a remote node to respond to a request.

The providers 40 may provide data transmission via a token bus interface using the IEEE 802.4 MAC protocol and broadband transmission at 10M bps and carrier band transmission at 5M bps. The Subnet card will support globally shared data as specified by the Subnet Architecture. This architecture provides for the explicit sharing of the data in a PC with other interested nodes on the subnet segment.

The source PC application node declares names and locations of data to be shared with each specified group of receiver nodes and an interval at which the contents of the data are to be sent. At each specified interval, the named data are collected and sent to all specified receiving nodes.

The input receiver of global data specifies the groups of which it is a member and for each group the name of the global data variables to be received, the local location to receive the data, and a maximum time interval in which data is expected. All global data on the subnet is inspected and when values for the desired variables are found, these values are used to update the local locations specified.

The services provided by global data are:
(1) Begin global output of named data items.
(2) End global output of named data items.
(33) Begin receiving named global data items.
(4) Stop receiving named global data items.

The PC application node interacts with the subnet LAN interface unit (LIU) using control blocks and an eight bit status byte. The control blocks are used in conjunction with a serial communication request (SCReq) command in the application program logic to request communication services of the subnet LIU. The status byte is used to communicate status information about the overall communications environment and about any application request which is pending in the subnet LIU.

The control blocks consist of contiguous sets of Series Six registers which contain the control block information. The first register of the control block (i.e., the register with the lowest register number) is used as the argument of the (SCReq) that initiates the request.

The overall status of the subnet communication environment is reflected in an eight bit status byte which is updated on each communication request and on each sweep to contain the current communication state. The bits of the status byte are used to convey various information about the communication environment. Each bit in the status is guaranteed to remain in a state for at least one full sweep of the PC logic before changing to the opposite state. This guarantees the visibility of any communication status changes to the entire application. Table 6 gives the uses of the (SCReq) status bits.

TABLE 6

| Bit | I/O | (SCReq) Status Usage Use |
|---|---|---|
| 1 | I1009 | Busy |
| 2 | I1010 | Complete Without Error |
| 3 | I1011 | Complete With Error |
| 4 | I1012 | Externally Initiated Read Occurred |
| 5 | I1013 | Externally Initiated Write Occurred |
| 6 | I1014 | Resource Problem in LIU |
| 7 | I1015 | MAP Data Indication |
| 8 | I1016 | Communication OK |

Messages transmitted on the subnet 38 in the inventive system have the format shown in Table 7.

TABLE 7 priority
destination address
source address
message type
format key
num variables = n
name 1 ($\frac{1}{4}$)
.
.
.
name 1 ($^{n-1}/n$)
.
.
.
type
length
location 1
name 2 ($\frac{1}{4}$)
.
.
.
name 2 ($^{n-1}/n$)
type
length
location 2
.
.
.
name n ($\frac{1}{4}$)
.
.
.
name n ($^{n-1}/n$)
type TABLE 7-continued length
location n The "priority" field is used to distinguish between priorities. Priority of access to the CPU and LAN will be given to high priority items over low priority items.

The "destination" "address" specifies a group address for global data (variable) or a unique address for other data.

"Source address" identifies the node transmitting the data.

"Message type" specifies whether or not the message is global.

"Format key" is a unique code assigned to the message by the source and is used to indicate that the message has a set format, i.e., successive transmissions of this message all have variables at the same address or byte location in the message; if the message format changes, the value of the format key will change.

The "number of variables" field specifies the number of variable names which follow in the message up to a maximum of 255.

The remainder of the control block consists of global variable definitions for output. Each definition consists of an eight octet (four register name, a length of the data to be transferred (expressed in number of registers), and the register number of the start of the data in the PC memory to be transferred. These entries are repeated for the number of variables specified in the "number of variables" field of the control block. A wild card character (whose value can be specified by the user) can be used in a name definition. The LIU software replaces all occurrences of the wild card character with a user specified replacement character. This allows a single PC application program to produce uniquely named output values when running in multiple PC's.

The overall structure of the subnet software is a set of tasks which implement the various communication layer services. Intertask communication requests are used to communicate service requests among the layers. The service entry points copy any relevant parameters into private work queue entries and schedule the task which provides the desired service.

Table 8 shows the tasks which make up the subnet software. Additional software provides the system services, diagnostics, software loading and configuration services.

TABLE 8

| Subnet Software Tasks | | |
|---|---|---|
| Task | Function | CPU Budget |
| LLC | Logical Link Control (Token Bus Driver) | 0.75 ms |
| PC | PC Interface Driver | 1.0 ms |
| GLBL | Globol I/O Server | 1.25 ms |
| TIMER | Timer MAnagement | .5 ms |

In addition to the normal state of transferring data, the LIU recognizes two distinct offline states which allow subsets of services to be accessed while restricting other services.

In the "configure only" state, the LIU remains out of communication with the network for user data traffic of any kind but allows network or station management services to be accessed. This means that all network access is stopped but allows establishment of a communication environment with default parameters if remote network management is to be used. This state allows network management to change the configuration parameters. This state can be forced by an option switch or it will be entered if the initialization logic determines that the configuration parameters may be invalid (based on a checksum and flags kept with the parameters).

In the "PC offline" state, the LIU remains in communication with the network for MAP traffic but all global inputs and outputs are halted. This state is entered whenever the PC enters the stop state.

LOGICAL LINK CONTROL

Logical Link Control (LLC) provides access to the subnet link. It manages the subnet TBC hardware and the link level protocol. The services provided by LLC (i.e., Bus Access Controller of FIG. 3) are those defined as IEEE 802.2 class 3 service, shown in Table 9. Only those services of LLC that are used by other portions of the system are reflected in Table 9.

TABLE 9

| Logical Link Control Services | |
|---|---|
| Name | Description |
| L__DATA.request | Requests the output of a message to a specified link destination. The destination address can be either an individual node or group address. |
| L__DATA.indication | Signals the arrival of a message from a remote node. |
| L__DATA__ACK. request | Requests the output of a message to a specified individual link destination. An acknowledgement must be received from the receiving station for this request to complete successfully. |
| L__DATA__ACK. indication | Signals the arrival of a message from a remote node which used the acknowledged connectionless protocol. The link acknowledgement has already been sent when this indication is made. |
| L__DATA__ACK__ STATUS. indication | Returns the result of a previous L__DATA__ACK.request. |
| L__GROUP.enable | Enables receiving of broadcast data on the specified group address. |
| L__GROUP.disable | Disables receiving of broadcast data on the specified group address. |
| L__STATUS. indication | Indicates a significant status change within the LLC or MAC layer of which some management entity should be aware. |
| L__TEST.request | Causes the transfer of some number of 802.2 test frame(s) to a target node. |
| L__TEST.confirm | Reports the status of a previously requested test including the number of correct test responses received. |
| L__XID.request | Causes the transfer of an 802.2 xid request frame to a target node. |
| L__XID.confirm | Reports the result of a previously requested xid exchange. |

A PC driver provides transfer between the subnet card and the Series Six PC using the protocol established for CCM data transfers. All access to the Series Six memory is accomplished through the services provided by the PC driver. The services are specified in a manner consistent with the other communication layer services. The services provided by the PC driver (i.e., Application Data Transfer FIG. 3) are shown in Table 10.

TABLE 10

| PC Driver Services | |
|---|---|
| Name | Description |
| CPU__DATA.indication | Indicates data from the PC application which contains a control block requesting a communication service. |
| CPU__DATA.request | Requests data from the subnet software be transferred to the PC memory or a buffer of data from the PC memory be transferred to the LIU. |
| CPU__DATA.confirm | Response to a CPU__DATA.request which contains the result of the transfer of data to or from the PC. |
| CPU__DATA__MODIFY. request | Requests data from the subnet software be used to update the PC memory under control of a mask. |
| CPU__DATA__MODIFY. confirm | Response to a CPU__DATA__MOD IFY. request which contains the result of the update of data in the PC. |
| CPU__STATUS. indication | Service used to modify the status bits transferred between the subnet card and the PC giving the status of the subnet software. |
| CPU__ABORT.indication | Indicates that the PC is no longer responding. |
| CPU__SWEEP.indication | Indicates a synchronization point in the PC sweep for application services needing such synchronization. |

The Global Data service provider 40 provides global data sharing along nodes on the subnet. It implements the protocol for global data specified in the Subnet Architecture without any ongoing involvement of the PC application. The global data service provider handles all message formatting, message passing, timer handling and PC data updating required by the global data protocol. The global data service provider defines no unique service interfaces beyond those described in the PC driver and LLC.

The services provided by Logical Link Control (LLC) are defined by IEEE 802.2 Class 3. Three types of data transfer service are provided: datagram, acknowledged connectionless datagram and data exchange.

Unacknowledged service provides the one-way delivery of data to one or more destination nodes. No attempt is made to assure the sender of the delivery of the data.

Send data with acknowledge service provides a one-way delivery data to a single destination node with assurance to the sender that it was received by the MAC layer in the destination.

Request with reply service provides for a two-way exchange of data between two nodes. Only one SDU is transferred on any LLC request.

Additional services are provided to register SAP values with LLC, modify the set of group addresses which LLC will recognize, signal LLC events, and to access LLC and MAC tallies.

The data transferred between LLC and the LLC user resides in buffers which are described by the buffer pointers passed as parameters. The buffers passed to LLC from the user on requests consist only of data. Any number of bytes can be passed in the buffer. The buffer associated with this request is freed by LLC after the service requested by the user is performed.

The buffers passed by LLC to the user contain two fields. The first field in the buffer consists of a pointer to any other buffers which may be associated with this indication. The remainder of the buffer consists of the input data. This structure allows the LLC layer to effectively use the scatter-gather capabilities of the TBC chip. If the pointer field is not NULL, then it is a pointer to the buffer descriptor of the next buffer in the input. The last (or only) buffer in the sequence will contain a NULL pointer in this field.

Figure 5A:
FIGS. 5A-5C illustrate protocol exchanges between peer Logical Link Control (LLC) users on a subnet.
Figure 5B:
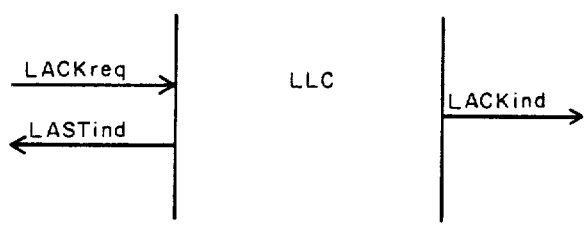
Figure 5C:
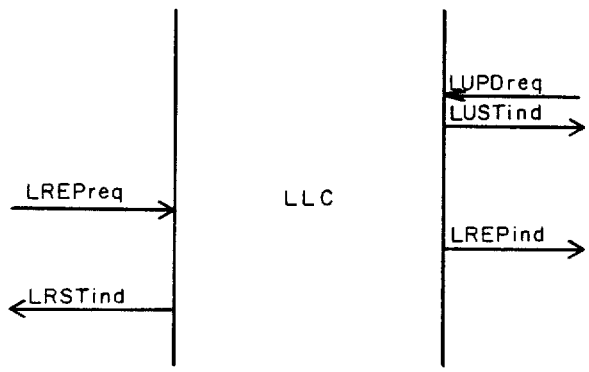

The protocol exchanges between peer LLC users are shown in graphical form in FIG. 5A, 5B and 5C for the unacknowledged connectionless, send data with acknowledge and request with reply services respectively. There are no time sequences involved with the other LLC primitives as they are local and atomic in nature.

The following services are available through the LLC:

L_REGISTER.request

This service resides in the LLC layer (L_service provider) and represents the L_REGISTER.request service. It is called by an LLC user to register the use of an LSAP and to provide the function name to be called for data indications received on the SAP. The caller-provided function receives all L_DATA.indication and L_DATA_ACK.indication indications from LLC.

The first parameter is an integer parameter specifying the LSAP which is to be registered. The second parameter is a pointer to the routine to receive data indications on the SAP. The function should be prepared to handle the four parameters associated with the data indications. If the function pointer is NULL, then the LSAP is deregistered and all further traffic for the LSAP is ignored. A maximum of 16 LSAPs may be registered.

L_DATA.request

This service resides in the LLC layer (L-service provider) and represents the L_DATA.request service.

It provides the transfer of an LLC SDU to a specified destination node. The first parameter (bp) is a pointer to the buffer containing the SDU to be transferred. Sufficient room remains in the front and rear of the buffer to allow the LLC layer to build its headers and trailers in the buffer without requiring any data movement. The second parameter (ra) is a character pointer which points to the remote (destination) address buffer. The format of the address buffer is a one byte length, followed by the link address of the destination, followed by a one byte length, followed by the destination LSAP. In all cases, the length of the link address will be sux bytes and the length of the LSAP will be one byte. Length indications will be present even though the lengths are always the same. The third parameter (la) is a character pointer which points to the local (source) address buffer. The format of the local address buffer is exactly the same as the remote address buffer. The fourth parameter (svc) is the class of service for the request. L_DATA.indication This service resides in the LLC user (L-service user) and represents the L-DATA.indication service. The indication function registered for the LSAP is called by LLC to indicate the arrival of an LLC SDU from a specific remote node. The first parameter (bp) is a pointer to the buffer that contains the SDU which was received. The second parameter (ra) is a character pointer which points to the remote (source) address buffer. The format of the address buffer is a one byte length, followed by the link address of the source, followed by a one byte length, followed by the source LSAP. The third parameter (la) is a character pointer which points to the local (destination) address buffer.

The format of the address buffer is the same as the previous parameter. The fourth parameter (svc) is the class of service for the request. L_GROUP.enable This service resides in the LLC layer (L-service provider) and represents the L_GROUP.enable service. It is called by an LLC user to enable the receipt of global data on a specified group address. The only parameter is an indication of the address (in the range of 1 to 47) to be added to the group address list.

The group addressing capability of the TBC uses a mask which is applied to all incoming group addresses. The input group address is ANDed with the group address mask and the result is compared with the group address assigned to the TBC. If the masked input group address matches the TBC group address, then the SDU was addressed to this node.

To allow multiple group addresses to be used, each group address available to the L-service user corresponds to a single bit in the MAC group address mask. All TBC group addresses are set to the value one (1) and the higher bits of the group address along with the group address mask are used to distinguish group addresses. The group address mask is initially set to all one bits. Thus, when it is ANDed to the input group address, all bits are unmasked. When a group address is added to the set, the bit corresponding to the requested group is changed to a zero thus disabling any effect it has on the group address filtering. A group address corresponds simply to the bit number of the bit which is to be set in the group address for the request.

L_GROUP.disable

This service resides in the LLC layer (L-service provider) and represents the L_GROUP.disable service. It is called by an LLC user to disable the receipt of global data on a specified group address. The only parameter is an indication of the address (in the range 1 to 47) to be removed from the group address list. The TBC group addressing scheme is discussed in LGRPena above.

PROGRAMMABLE LOGIC CONTROL DATA TRANSFER provided by the PC Driver are

The services specific to the Series Six PC and are defined here without reference to a standard. The different forms of data transfer among nodes on the subnet (MAP data and global data) are represented in the Subnet card (provider 40) by different tasks. All of these tasks use the PC data transfer services.

An underlying assumption of many applications of PCs is the predictable periodic sampling or updating of control points (or I/O's) in a process. To accomplish this, the PC application is structured as a sequence of logic which is processed repeatedly from top to bottom. Each cycle of processing the PC application is known as a "sweep" since it sweeps one pass through the application logic.

Sweep processing on the Series Six consists of processing other than the solution of the application logic. Communication with many of the "smart" devices such as the programming terminal, the BASIC module and the communications devices are handled in "windows" which are portions of the sweep dedicated to serving the device.

Figure 6:
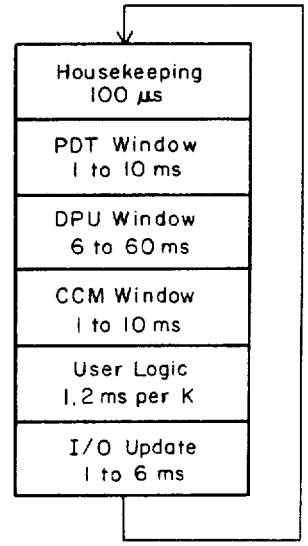
FIG. 6 illustrates a processing cycle in an exemplary programmable controller.

FIG. 6 shows the cycle of processing in a Series Six PC.

Figure 7:
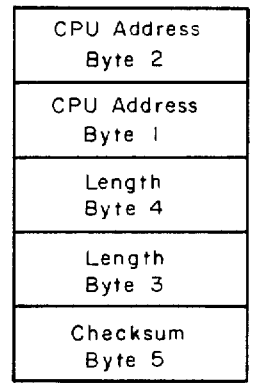
FIG. 7 illustrates the transfer header structure in the PC of FIG. 6.

The buffers transferred between the PC driver and the Series Six PC consist of a five byte header followed immediately by the data to be transferred or a buffer for data to be read from the PC. The structure of the buffers is a two byte memory address followed by a two byte length of the transfer followed by a one byte checksum over the heading (see FIG. 7). The transfer length field is used to encode both the number of words to be transferred and the direction of the transfer. If the high bit of the transfer length field is a one, the transfer is a read from the Series Six memory into the buffer of the request. If this bit is a zero, the data in the buffer is written to the Series Six memory. The length used for the transfer is one less than the desired length, thus a length of zero causes one word to be transferred.

The checksum is the sum of the individual bytes of the header (bytes 1 through 4). An incorrect checksum will result in the CCM window being permanently closed by the Series Six PC. The byte order for 16 bit quantities is identical between the Series Six PC and the Intel family of processors; that is, the first (lower address) byte of a two byte quantity contains the least significant byte of the quantity and the second (higher address) byte contains the most significant byte. A special header is reserved to allow the LIU software to close the window.

The bandwidth of the channel between the Subnet card (provider 40) and the Series Six PC is fairly small (5 ms per byte), the amount of time alotted to moving data between the LIU and the PC is small (approximately 10 ms), and the amount of data to be moved may be substantial. Therefore, the PC driver contains the concept of priority or class of service associated with a transfer request. The class of service is used to allocate the transfer bandwidth to the most critical messages first.

Class of service is only associated with requests made by the Subnet software. The parameter data associated with a transfer initiated by the PC application using a [SCReq] is transferred during the [SCReq] window (except for large global data requests which are only partially transferred). The executive window is used to transfer all data except the [SCReq] parameter block and class of service is honored on all of these requests.

Eight classes of service are available for use in the PC driver. Service classes are organized so that the higher the number, the lower the priority of the request. The assignment of service class is one of the most powerful tuning parameters available to influence the performance of the various services performed by the Subnet card. Table 11 below lists the initial breakdown of service class.

TABLE 11

| Series Six PC Service Classes | |
|---|---|
| Class | Use |
| 0 | Unused |
| 1 | High Priority Global Data Reads and Writes |
| 2 | Low Priority Global Data Reads and Writes |
| 3 | Datagram Reads and Writes |
| 4 | Unused |
| 5 | Remotely Initiated MAP Reads and Writes |
| 6 | Unused |
| 7 | Locally Initiated MAP Reads and Writes |

Figure 8A:
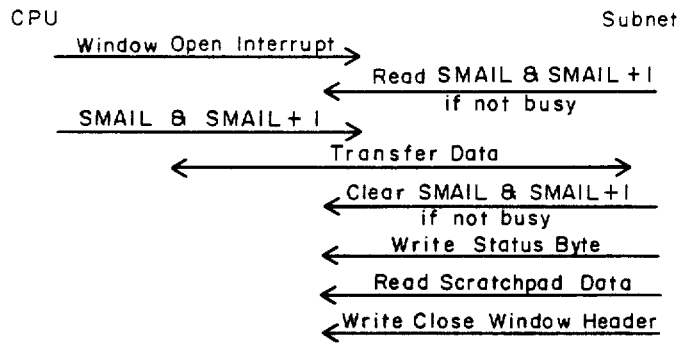
FIGS. 8A-8B illustrate a protocol sequence between a Subnet PC driver and a PC.
Figure 8B:
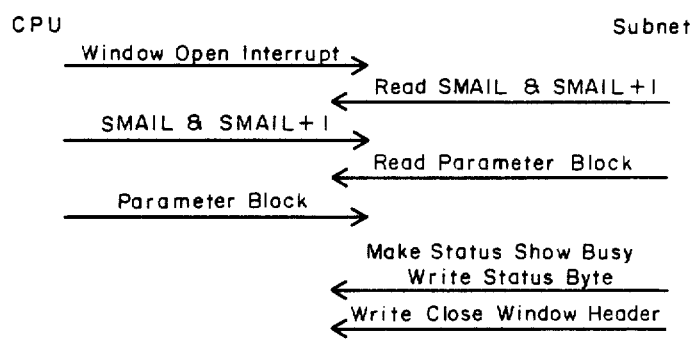

FIGS. 8A-8B show the overall protocol sequence between the Subnet PC driver and the Series Six PC during the executive window and during a [SCReq] window. All transfer of link data takes place during the executive window. The [SCReq] window is restricted to transferring the data associated with the request.

In order to distinguish the Executive window, the driver first checks the state of the "busy" status bit. If the "busy" bit is set, then the window is assumed to be an executive window. It the "busy" bit is clear, the contents of SMAIL & SMAIL+1 are checked for value. If these cells contain a non-zero value, the request was initiated by a [SCReq]. The contents of the mailbox sent by the PC on a [SCReq] contains in its most significant six bits the most significant six bits of the contents of the register associated with the [SCReq] (for subnet 38 this is the most significant bits of the command) followed by ten bits specifying the register associated with the request. Note that this restricts the command blocks for [SCReq]'s to beginning in the first 1024 registers in the Series Six.

At the end of each executive window, the driver reads status information about the state of the PC CPU into the LIU memory. This information includes the RUN/STOP state, the state of the memory protect switch, and other state information which can change due to outside events and which may influence the state of the LIU software. A DMA checksum is available in the scratch pad which would allow an integrity check for the data transfer. Various services available through the PC are listed below.

CPU_DATA.indication

This service resides in the PC Driver user (C-service user) and represents the

CPU_DATA.indication service. The first parameter contains the pointer to a buffer containing the data associated with the service request. This buffer will be a control block associated with the service requested by the PC application in the PC. The second parameter is the absolute address in the PC at which the parameter block begins. This service is unacknowledged (i.e. there is no corresponding CPU_DATA.response sent when the service is performed. CPU_DATA.request This service resides in the PC driver (C-service provider) and represents the CPU_DATA.request. This service transfers data to or from the Series 6 PC at the request of the application service tasks in the Subnet card. The request contains the address of the buffer to be transferred and the information required by the PC driver to build a transfer header.

The first parameter is a pointer to a buffer containing the data to be transferred to the Series Six PC or to be received from the PC. Sufficient room remains in the front of the buffer to allow the construction of the header for the transfer without moving the data. The second parameter is the absolute address within the Series Six for the transfer. The third parameter is the byte length of the transfer. The fourth parameter is the direction of the transfer. The direction can be either "TO CPU" for a write to Series Six memory, or "FROM_CPU" for a read from the Series Six memory. The fifth parameter is the class of service of the request.

The sixth and seventh parameters are used together to update the CCM status byte after the transfer has taken place. The sixth parameter is an "and" mask and the seventh parameter is an "or" mask. When the transfer requested by this service is complete the "and" mask is logically and'ed with the current CCM status and then the "or" mask is logically or'ed with the CCM status. This new status is then saved as an updated CCM status.

The eighth and ninth parameters are used to specify the confirm function to be invoked when the transfer is completed. The eighth parameter is the address of the confirm function which should be given control when the transfer is complete. The ninth parameter is an integer value which is passed as a parameter to the confirm function. This parameter can be used to identify the confirmation in some request-specific way. CPU_DATA.confirm This service resides in the PC Driver user (C-service user) and represents the CPU_DATA.confirm service. The name of this service is actually indefinite since the function which is to perform this service is passed as a parameter to the CDATreq call.

The first parameter is a pointer to the buffer which contains the data associated with the indication being responded to. The second parameter is an integer parameter which was specified on the request for this response and its significance is determined by the C-service user.

CPU_DATA MODIFY.request

This service resides in the PC driver (C-service provider) and represents the CPU_DATA MODIFY.request. This service causes data in the PC memory to be modified (that is read, changed and rewritten) under the control of a mask. This allows the changing of individual bits in the PC memory. The request contains the address and length of the PC memory to be updated along with the data and the mask to be used to modify the PC memory.

The first parameter is a pointer to a buffer containing the data to be transferred to the Series Six PC under control of the mask. The second parameter is the absolute address within the Series Six to be modified. The third parameter is the byte length of the data.

The fourth parameter is a pointer to a buffer containing the mask associated with the request. Each byte of the mask data is applied against the data buffer to determine which bits of the PC memory are to be changed. A one bit indicates that the data bit from the data buffer should be used to update the corresponding bit in the PC memory. A zero bit indicates no change in the PC memory. If the buffer associated with the mask is shorter than the requested amount of update, the remaining bytes of mask are assumed to be hexadecimal value FFH (that is to say that all bits in the PC memory will be modified).

The fifth parameter is the class of service of the request.

The sixth and seventh parameters are used together to update the CCM status byte after the update has taken place. The sixth parameter is an "and" mask and the seventh parameter is an "or" mask. When the transfer requested by this service is complete the "and" mask is logically and'ed with the current CCM status and then the "or" mask is logically or'ed with the CCM status. This new status is then saved as an updated CCM status.

The eighth and ninth parameters are used to specify the confirm function to be invoked when the transfer is completed. The eighth parameter is the address of the confirm function which should be given control when the transfer is complete. The ninth parameter is an integer value which is passed as a parameter to the confirm function. This parameter can be used to identify the confirmation in some request-specific way. CPU_DATA MODIFY.confirm This service resides in the PC Driver user (C-service user) and represents the CPU_DATA_MODIFY.confirm service. The name of tis service is actually indefinite since the function which is to perform this service is passed as a parameter to the CMODreq call.

The first parameter is a pointer to the buffer which contains the data associated with the indication being responded to. The second parameter is an integer parameter which was specified on the request for this response and its significance is determined by the C-service user. CPU_STATUS.request This service resides in the PC Driver (C-service provider) and corresponds to the CPU_STATUS.request. This service allows a C-service user to set or reset bits in the CCM status word which is maintained by the PC Driver and is transferred to the Series Six PC at the end of each transfer window.

The first parameter is an "and" mask and the second parameter is an "or" mask. The "and" mask is logically and'ed with the current CCM status and then the "or" mask is logically or'ed with the CCM status. This new status is then saved as an updated CCM status. Remember that the status will not immediately be changed in the Series Six PC but will be changed at the end of the next transfer window. This means that multiple CSTAind's may have been performed before the PC application is able to see the updated status. CPU_ABORT.indication This service resides in the PC Driver user (C-service user) and provides the CPU_ABORT.indication service. The PC abort indicates that the PC application program or the Series Six PC has ceased to communicate and any communication connections in use should be aborted. There are no parameters associated with this service. CPU_SWEEP.indication This service resides in the PC Driver user (C-service user) and provides the CPU_SWEEP.indication service. This service indicates that a synchronization point has been reached in the PC sweep logic processing. This allows activities which must be initiated on a per sweep basis to be notified of the occurrence of sweeps. On the Series Six, the sweep synchronization point is at the end of the executive window for communication. There are no parameters associated with this service.

Figure 9:
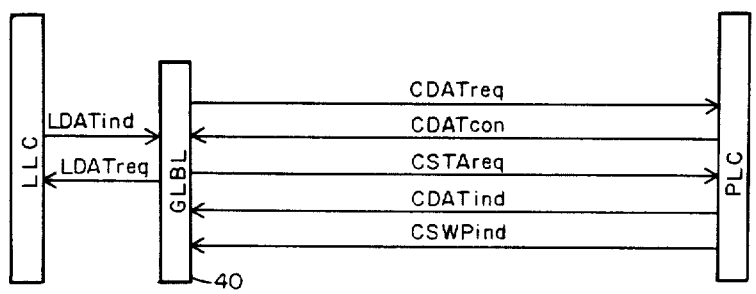
FIG. 9 shows types of data flowing through a global data service provider.

The overall data flow through the Series Six LIU is shown in FIG. 9. The figure shows data flows labelled by the service entry point which they use in transferring the data associated with the request. The network management and system service interfaces are not shown explicitly as they are immersed in all of the layer tasks.

Figure 3:
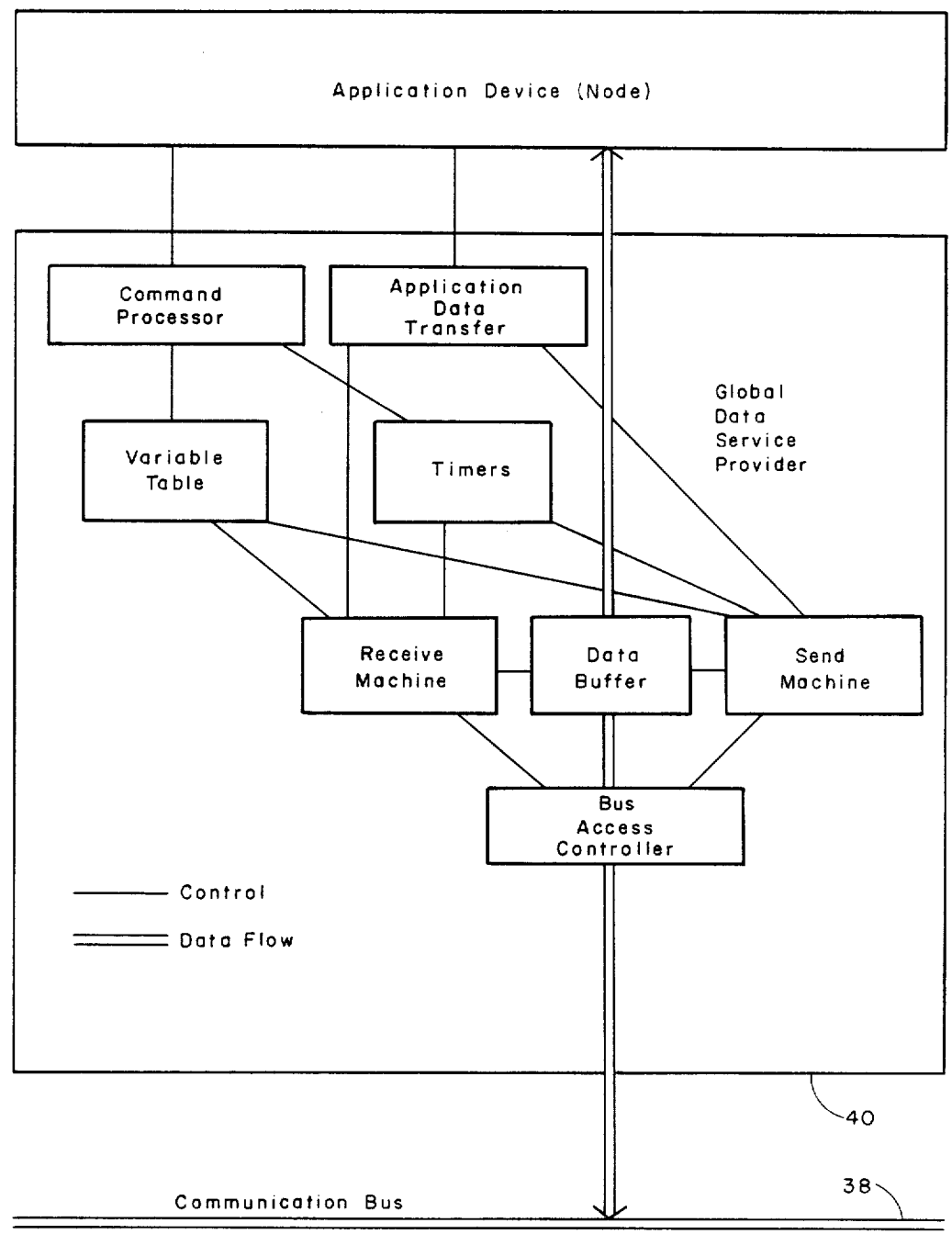
FIG. 3 is a functional block diagram of a global data service provider in an exemplary form of the present invention.

FIG. 3 is a functional block diagram of a global data service provider 40 connected between an application device (node) such as a PC and a subnet LAN 38. The application device initiates communication service requests in the form illustrated in Table 3. It also provides storage for output variables, input variables, and input-variable-status register (Valid/Timeout Fault/Definition Fault); maintains appropriate values of output variables and acts on input variables unless the corresponding input-variable-status register indicates a fault. The global data service provider 40 comprises several functional blocks defined as follows:

Command Processor

Receives Application Device service requests;
Determines validity of requests and acknowledges same to Application Device;
Initializes the Variable Table and the input-register-status register;
For send requests, generates a message format and sets the value of the format key;

Associate each variable with a Timer and initiates (or, if the stop command, stops) the Timers.

Timers

Timers associated with output variables periodically activate the Send Machine;

Timers associated with input variables activate the Receive Machine, but the Receive Machine may forestall expiration indefinitely, by restarting the Timer prior to expiration;

Each Timer is associated with the corresponding entry in the Variable Table.

Send Machine

When activated, by a Timer, requests, via the Application Data Transfer, that the Application Device output the current (updated) value of the associated variable to the Date Buffer;

When not notified by the Application Data Transfer that the output is complete, puts the updated data into the message format previously determined by the Command Processor, and requests that the Bus Access Controller send it.

Application Data Transfer

Performs transfers between the Application Device and the Data Buffer synchronous with the Application Device.

Data Buffer

Temporary storage to hold waiting to be output on the Communication Bus or waiting to be input to the Application Device.

Bus Access Controller

Implements the access control protocol common to all the nodes attached to the Communication Bus;

Sends messages from the Data Buffer to the Communication Bus as requested by the Send Machine;

Receives messages from the Communication Bus to the Data Buffer and notifies the Receive Machine.

Variable Table

Holds the cross-reference between local and global references for each variable and, for input variables, a reference to the associated input-variable-status register;

For input variables, stores the input variable state (Search/Transfer), and if in the Transfer state, the current input message format identifier (destination address, source address, format key);

For input variables, associates with each entry the corresponding timer.

Receive Machine

When activated by receipt of a message via the Bus Access Controller, scans the Variable Table and;

Saves received variables that have been requested and are valid (discarding others);

Updates the associated input-variable-status registers;

Updates the associated input variable states, and;

Restarts the associated Timers;

When activated via a Timer, updates the associated input-variable-status register and input variable state;

Requests transfer of data and input variable-status register to the Application Device via the Application Data Transfer.

Figure 4A:
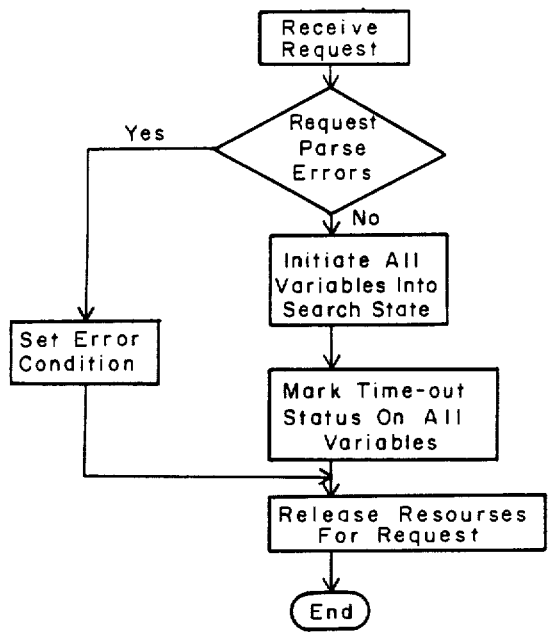
FIGS. 4A-4G are a sequence of flow charts illustrating a preferred method of communication processing in accordance with the present invention.
Figure 4B:
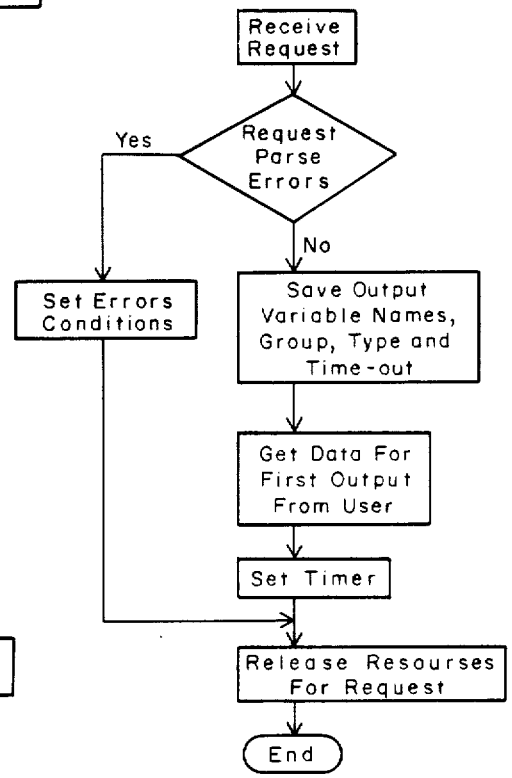
Figure 4C:
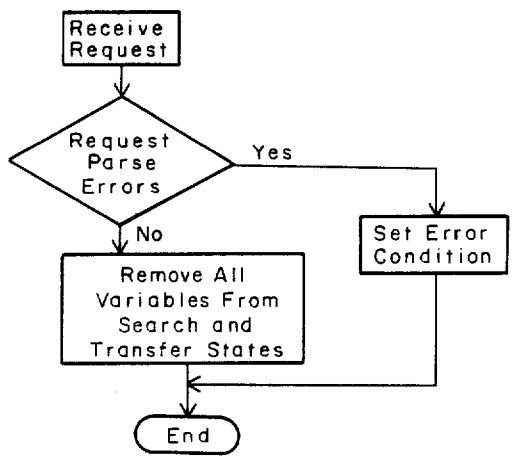
Figure 4D:
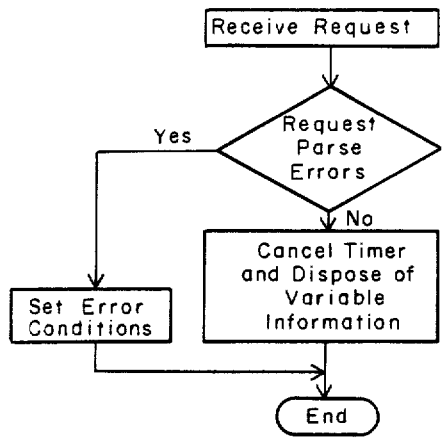
Figure 4F:
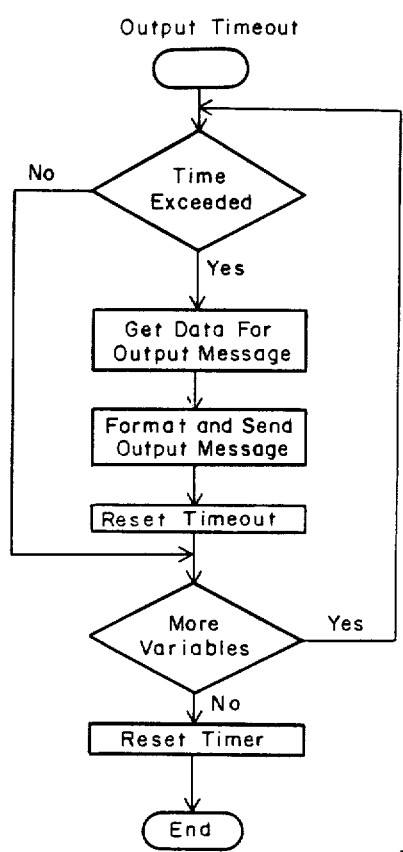
Figure 4E:
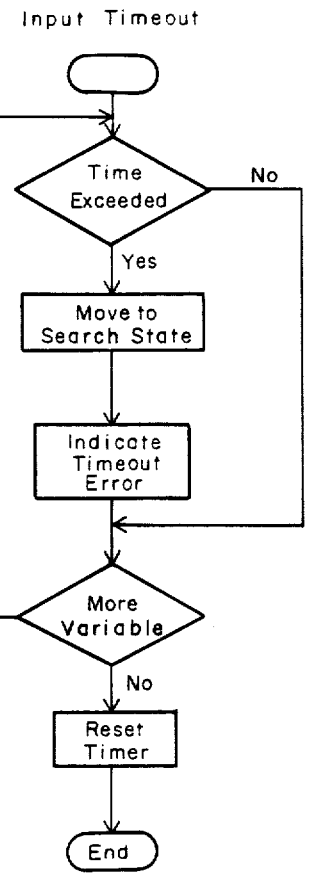

FIGS. 4A–4G are functional flow charts illustrating data handling by a service provider 40. The charts in FIGS. 4A–4D illustrate the processing of start and stop requests. FIGS. 4E–4F represent, respectively, input and output data timer controls. As described above, each variable is associated with a processing time allowing processing to be terminated if a variable is not found within a set time.

Figure 4G:
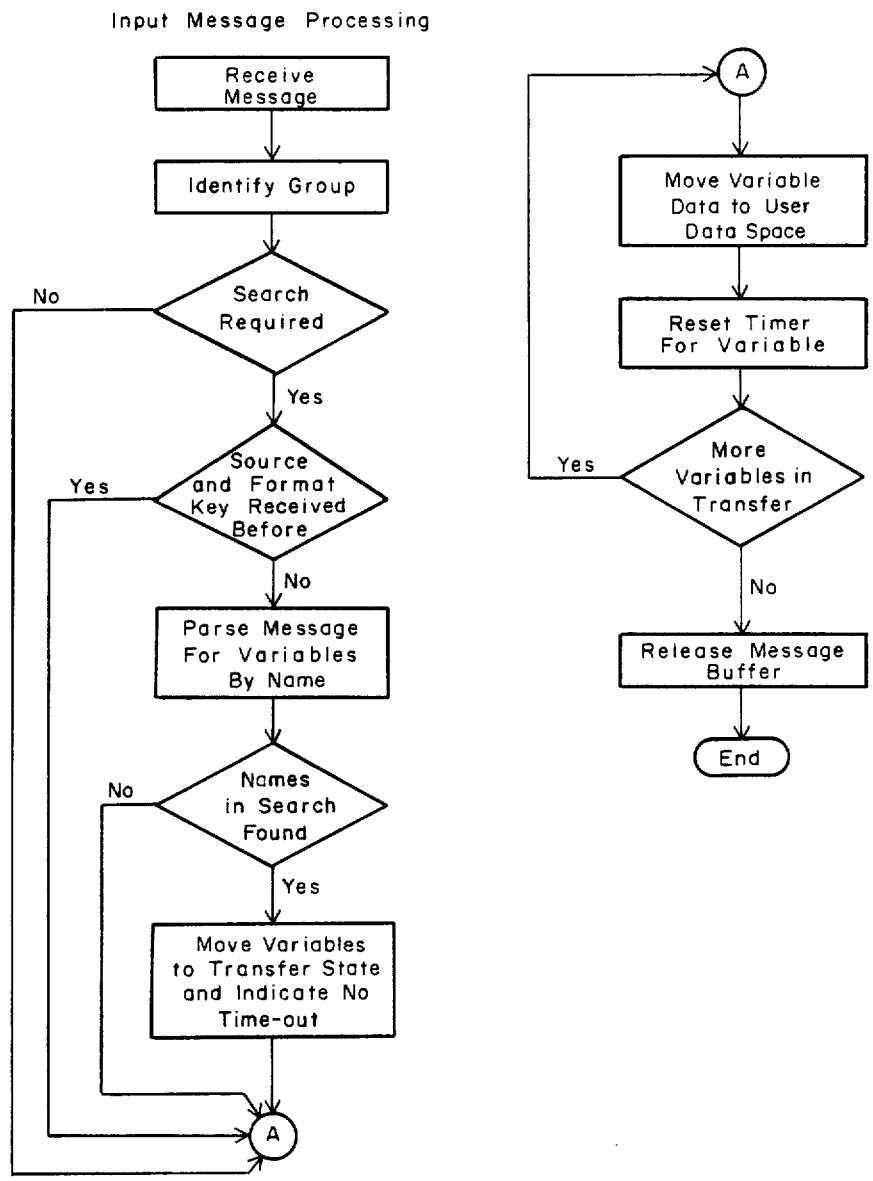

FIG. 4G illustrates the processing of a message for identifying data of interest to a node. If the message (link frame) on the bus is identified as intended for the receiving node (group address), the provider 40 determines if a message has been received from this source before. If it has, and if the format key is unchanged, the process of searching for a variable requires only that the offset to the data of interest be recalled from memory in order to index directly to the data. For a first time message search, the provider sequential searches (parses and tests) the message for variable names of interest.

It will be appreciated that the data sharing mechanism of the present invention includes the following features:

1. Global variables are addressed by symbolic "names".
2. There may be multiple "namespaces" for variable names (within each namespace, each variable's name must be unique).
3. Once defined for output by the source node, each global variable is periodically sampled from its source node by the global data service and broadcast to all other nodes over the communications bus. (Global output from the node may be defined or terminated by that node at any time.)
4. The global data service at each node filters received broadcast messages and passes to the associated sink node all received samples of those variables (but only those variables) that are defined for input by that node. (Global input to the node may be defined or terminated by that node at any time.)
5. Each node may be source for some variables and sink for others
6. Variable definition parameters apply independently to each variable; the parameters include specification of the data type and size of the variable.
7. The global data service and protocol assure that portions of two different samples of a variable are never combined and passed as a single sample. Nor will samples be reversed in time order. (Though any sample which is found to contain a communication error will not be delivered to a sink node.)
8. A unique format "key" indicates when a broadcast message containing a global variable is structured differently from a preceding broadcast message containing that variable.
9 Detects and reports to the sink node differences in a variable's definitions between the source and sink nodes.
10. Detects and reports to the sink node failure to receive a sample of a global variable within a specified time interval.
11. Allows sharing of the communication bus with other kinds of data and protocols.

While it will be recognized that the present invention is a combination of hardware in which a novel method is implemented in the form of control programs (software), the description in terms of functional block diagrams is believed sufficient to enable construction of the invention. Furthermore, the software programs may be written in many forms to accomplish the functions disclosed herein. Detailed manuals describing uses of LAN's by PC's are available from their manufacturers. The details provided herein are only intended to reflect those PC functions and features which interact with the present invention.

What has been described is a data sharing mechanism employing a broadcast bus communication system in which global variables are exchanged between connected nodes or devices on the system via a global data service provider and unique protocol. While the invention has been described in an exemplary embodiment, other adaptations and arrangements will become apparent to those skilled in the art. It is intended therefore that the invention be interpreted in accordance with the spirit of the appended claims.

What is claimed is:

1. A method for high speed data acquisition in a distributed process control system in response to data input request signals and data output request signals in which a plurality of control and monitoring nodes are coupled to a broadcast bus of a data communication system, a data service interface being connected between each of the nodes and the broadcast bus, the method comprising the steps of:

- transferring from at least one of the nodes to a corresponding interface a data input request signal indicating data priority, update rate and a symbolic global variable name;
- transferring from at least one of the nodes to a corresponding interface a data output request signal indicating data priority, update rate and a symbolic global variable name;
- receiving said data input request signal in the interface and generating a formatted message comprising a plurality of message data blocks in which each message data block corresponds to a selected data field, the message data blocks including at least a priority field, a destination address field, a source address field, a global identifier field, a key field and a sequence of data fields;
- broadcasting the formatted message onto the broadcast bus from the interface generating the formatted message;
- evaluating the destination address field at each of the interfaces which have received a data input request signal for identifying data fields for passage to the nodes coupled to the respective interfaces;
- for each data field identified for passage to a node, determining at the respective interface whether a prior formatted message having the same source address field and key field ad the present formatted message has been received;
- identifying in the interface an offset number of bits from a predetermined point in the formatted message to each data field representing data identified for passage to a node;
- for each formatted message having a source address field and/or key field different from any prior received formatted message, storing in memory in the respective one of the interfaces the offset number of data bits between the predetermined point in the formatted message and the data field identified for passage to the corresponding node;
- stepping directly to the data field identified for passage to a node using the identified offset number of bits from the predetermined point to the data field; and
- transferring from the interface the data field to the corresponding node.

* * * * *

UNITED STATES PATENT AND TRADEMARK OFFICE
CERTIFICATE OF CORRECTION

PATENT NO. : 4,926,375

DATED : May 15, 1990

INVENTOR(S) : Mercer et al.

It is certified that error appears in the above-identified patent and that said Letters Patent is hereby corrected as shown below:

ON THE TITLE PAGE: item [54], and in column 1, line 5, in the titles:
Change "MASSAGE" to --MESSAGE--.

Signed and Sealed this

Thirteenth Day of August, 1991

Attest:

HARRY F. MANBECK, JR.

*Attesting Officer*  *Commissioner of Patents and Trademarks*